United States Patent
Ju et al.

(10) Patent No.: US 10,437,352 B2
(45) Date of Patent: Oct. 8, 2019

(54) ACTIVE STYLUS AND DETECTION METHOD THEREOF

(71) Applicant: Acer Incorporated, New Taipei (TW)

(72) Inventors: Tai Ju, New Taipei (TW); Chih-Chiang Chen, New Taipei (TW); Chueh-Pin Ko, New Taipei (TW)

(73) Assignee: Acer Incorporated, New Taipei (TW)

( * ) Notice: Subject to any disclaimer, the term of this patent is extended or adjusted under 35 U.S.C. 154(b) by 33 days.

(21) Appl. No.: 15/803,848

(22) Filed: Nov. 6, 2017

(65) Prior Publication Data
US 2019/0064942 A1    Feb. 28, 2019

(30) Foreign Application Priority Data
Aug. 24, 2017  (TW) .................. 106128768

(51) Int. Cl.
| | |
|---|---|
| *G06F 3/0354* | (2013.01) |
| *G06F 3/03* | (2006.01) |
| *G06F 3/038* | (2013.01) |
| *G06F 3/041* | (2006.01) |

(52) U.S. Cl.
CPC ........ *G06F 3/03545* (2013.01); *G06F 3/0304* (2013.01); *G06F 3/0383* (2013.01); *G06F 3/0386* (2013.01); *G06F 3/0412* (2013.01)

(58) Field of Classification Search
USPC ......................................................... 345/179
See application file for complete search history.

(56) References Cited

U.S. PATENT DOCUMENTS

| | | | |
|---|---|---|---|
| 7,110,100 B2 | 9/2006 | Buermann et al. | |
| 2002/0148655 A1* | 10/2002 | Cho | G06F 3/03542 178/18.09 |
| 2016/0062492 A1* | 3/2016 | Geller | G06F 3/03545 345/179 |
| 2018/0196574 A1* | 7/2018 | Case, Jr. | G06F 3/0418 |

FOREIGN PATENT DOCUMENTS

| | | |
|---|---|---|
| CN | 101167042 | 4/2008 |
| CN | 103576919 | 2/2014 |
| CN | 106933390 | 7/2017 |
| TW | M520677 | 4/2016 |
| TW | 201617799 | 5/2016 |

\* cited by examiner

*Primary Examiner* — Deeprose Subedi
(74) *Attorney, Agent, or Firm* — JCIPRNET

(57) ABSTRACT

An active stylus and a detection method thereof are provided. The active stylus includes a first optical distance measurement circuit, a second optical distance measurement circuit and a signal processing circuit. The first optical distance measurement circuit is arranged at/on the side of the active stylus to measure a first distance between the active stylus and a target surface. The second optical distance measurement circuit is arranged at/on the other side of the active stylus to measure a second distance between the active stylus and the target surface. By using the first distance and the second distance, the signal processing circuit calculates an inclination angle of the active stylus relative to the target surface, and/or detects the rotation direction of the active stylus with the long axis direction as the rotation axis.

11 Claims, 5 Drawing Sheets

ACTIVE STYLUS AND DETECTION METHOD THEREOF

CROSS-REFERENCE TO RELATED APPLICATION

This application claims the priority benefit of Taiwan application serial no. 106128768, filed on Aug. 24, 2017. The entirety of the above-mentioned patent application is hereby incorporated by reference herein and made a part of this specification.

BACKGROUND OF THE INVENTION

Field of the Invention

The invention is related to a stylus, and particularly to an active stylus and a detection method thereof.

Description of Related Art

Along with prosperous development of touch electronic devices (e.g., tablet PC, smart phones and so on), generally users can operate an electronic device via a stylus, for example, to write text or record related data on a touch screen by using a stylus. Conventionally, an electric field is formed on a tip portion of the active stylus. When the active stylus is in contact with the touch screen (or touch panel), the touch screen (or touch panel) is capable of sensing the electric field and calculating the touch position. Conventional active stylus can only provide the writing function for one type of handwriting; that is, conventional active stylus cannot determine an inclination angle of itself (active stylus) relative to a target surface (e.g., touch panel). Furthermore, conventional active stylus cannot detect a rotating direction of itself (active stylus) with a longitudinal direction as a rotating axis.

SUMMARY OF THE INVENTION

The invention provides an active stylus and a detection method thereof to detect an inclination angle and/or a rotating direction of the active stylus.

An embodiment of the invention provides an active stylus, including a first optical distance measurement circuit, a second optical distance measurement circuit and a signal processing circuit. The first optical distance measurement circuit is disposed on one side of the active stylus for measuring a first distance between the active stylus and a target surface. The second optical distance measurement circuit is disposed on another side of the active stylus for measuring a second distance between the active stylus and the target surface. A signal processing circuit is coupled to the first optical distance measurement circuit to receive the first distance, and coupled to the second optical distance measurement circuit to receive the second distance. By at least using the first distance and the second distance, the signal processing circuit is capable of calculating an inclination angle of the active stylus relative to the target surface and/or detecting a rotating direction of the active stylus with a longitudinal direction as a rotating axis.

An embodiment of the invention provides a detection method of an active stylus; the method includes disposing a first optical distance measurement circuit on one side of the active stylus; disposing a second optical distance measurement circuit on another side of the active stylus; measuring a first distance between the active stylus and the target surface via the first optical distance measurement circuit; measuring a second distance between the active stylus and the target surface via the second optical distance measurement circuit; and calculating, by at least using the first distance and the second distance via the signal processing circuit, an inclination angle of the active stylus relative to the target surface and/or detecting a rotating direction of the active stylus with a longitudinal direction as a rotating axis.

In summary, the active stylus and the detection method thereof provided by the embodiments of the invention are capable of using different optical distance measurement circuits to measure a plurality of distances (e.g., first distance and second distance) between the active stylus and the target surface. By using the distances, the active stylus is capable of calculating the inclination angle of the active stylus relative to the target surface and/or detecting the rotating direction of the active stylus with the longitudinal direction as the rotating axis.

In order to make the aforementioned features and advantages of the invention more comprehensible, embodiments accompanying figures are described in detail below.

DESCRIPTION OF EMBODIMENTS

Figure 1:
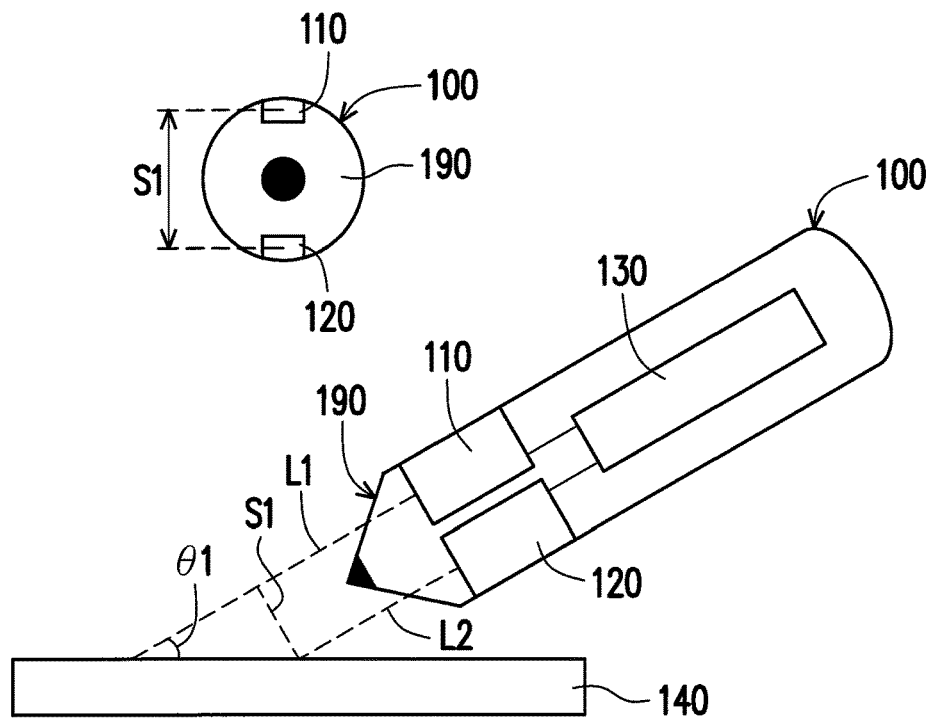
FIG. 1 is a schematic circuit block diagram and a schematic view of implementation of an active stylus according to an embodiment of the invention.

The word "couple" (or connect) in the description and claims may refer to any direct or indirect connection. For instance, in the description and claims, if a first device is coupled to (or connected to) a second device, it means that the first device may be directly connected to the second device or may be indirectly connected to the second device through another device or by another connection means. Moreover, elements/components/steps with same reference numbers represent the same or similar parts in the drawings and embodiments. The descriptions of the same elements/components/steps in an embodiment of the invention may be applied to the descriptions of the same elements/components/steps in another embodiment.

FIG. 1 is a schematic circuit block diagram of an active stylus 100 according to an embodiment of the invention. The active stylus 100 includes a first optical distance measurement circuit 110, a second optical distance measurement circuit 120 and a signal processing circuit 130. Depending on the requirement of design, the first optical distance measurement circuit 110 and/or the second optical distance measurement circuit 120 may be any type of distance measurement element/circuit. For example, the first optical distance measurement circuit 110 and/or the second optical distance measurement circuit 120 may be a conventional optical distance measurement circuit or other optical distance measurement element/circuit. The details of operation of the conventional optical distance measurer are not incorporated herein. The optical distance measurement circuit is capable of projecting a light onto a target surface and detecting the light reflected from the target surface. Based on the detected reflective light, the optical distance measurement circuit can acquire the distance between the optical distance measurement circuit and the target surface.

The first optical distance measurement circuit 110 and the second optical distance measurement circuit 120 are disposed on different sides (different positions) of the active stylus 100. For example (but not limited thereto), the first optical distance measurement circuit 110 may be disposed on a first side of a tip portion 190 of the active stylus 100, and the second optical distance measurement circuit 120 may be disposed on a second side of the tip portion 190 of the active stylus 100. As shown in FIG. 1, the first optical distance measurement circuit 110 projects a light onto a target surface 140 (e.g., touch display panel, touch panel or any plane) to measure a first distance L1 between the active stylus 100 and the target surface 140. The second optical distance measurement circuit 120 also projects the light onto the target surface 140 to measure a second distance L2 between the active stylus 100 and the target surface 140. Specifically, a light projecting direction of the first optical distance measurement circuit 110 and a light projecting direction of the second optical distance measurement circuit 120 are parallel with a longitudinal direction of the active stylus 100, and a third distance S1 is located between the first distance L1 and the second distance L2 (i.e., between an optical path of the first optical distance measurement circuit 110 and an optical path of the second optical distance measurement circuit 120).

The signal processing circuit 130 of the active stylus 100 is coupled to the first optical distance measurement circuit 110 and the second optical distance measurement circuit 120 to respectively receive a distance information about the first distance L1 and the second distance L2. The signal processing circuit 130 may at least use the first distance L1 and the second distance L2 to calculate an inclination angle θ1 of the active stylus 100 relative to the target surface 140 and/or detect a rotating direction of the active stylus 100 with a longitudinal direction as a rotating axis (please refer to descriptions about FIG. 3A, FIG. 3B and/or FIG. 6 for inference). Depending on the requirement of design, the signal processing circuit 130 may use any geometric algorithm to calculate the first distance L1 and the second distance L2 to acquire the inclination angle θ1. For example (but not limited thereto), the signal processing circuit 130 may calculate the first distance L1 and the second distance L2 via the following equation 1 to acquire the inclination angle θ1.

$$\theta 1=\tan^{-1}(S1/(L1-L2)) \qquad \text{Equation 1}$$

When using a practical pen in writing, since user writes at different angles depending on personal habit, the presented handwritings are different. In the embodiment, the active stylus 100 is capable of detecting the inclination angle θ1 of itself (active stylus 100) relative to the target surface 140, and reporting the inclination angle θ1 to a host (e.g., touch display device). For example, the target surface 140 may be a touch display panel of the host. The active stylus 100 may report the inclination angle θ1 to the host; thereafter, the host may exhibit an effect of different handwriting at different writing angles on the touch display panel (target surface 140) according to the inclination angle θ1 of the active stylus 100.

Figure 2:
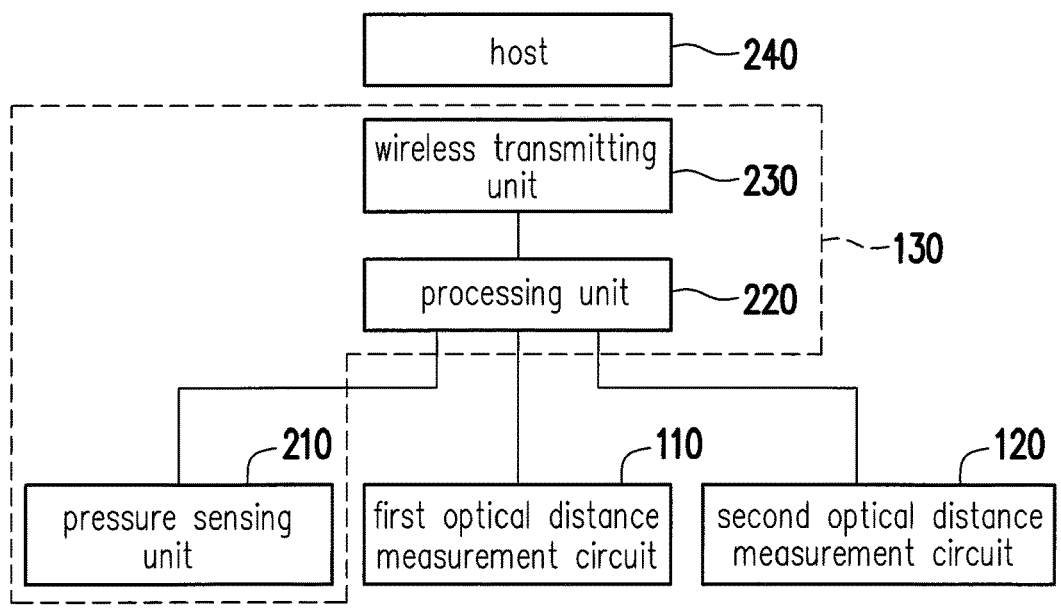
FIG. 2 is a schematic circuit block diagram of a signal processing circuit in FIG. 1 according to an embodiment of the invention.

FIG. 2 is a schematic circuit block diagram of the signal processing circuit 130 in FIG. 1 according to an embodiment of the invention. The signal processing circuit 130 includes a pressure sensing unit 210, a processing unit 220 and a wireless transmitting unit 230. The processing unit 220 is, for example, a central processing unit (CPU), or other programmable microprocessor for general purpose or special purpose, a digital signal processor (DSP), a programmable controller, an application specific integrated circuit (ASIC), other similar element, or a combination of the above-mentioned elements. The wireless transmitting unit 230 may be a global system for mobile communication (GSM) circuit, a personal handy-phone system (PHS) circuit, a code division multiple access (CDMA) circuit, a wideband code division multiple access (WCDMA) circuit, a long term evolution (LTE) circuit, a worldwide interoperability for microwave access (WiMAX) circuit, a wireless fidelity (Wi-Fi) circuit, a Bluetooth circuit or other wireless transmitting element/circuit.

The pressure sensing unit 210 is coupled to the processing unit 220. Specifically, the pressure sensing unit 210 is mainly used to detect whether the active stylus 100 enters a working status. For example, when the user holds the active stylus 100 to perform operating actions such writing text or browsing pages on a smart phone or a tablet PC, the pressure sensing unit 210 in the signal processing circuit 130 is capable of sensing the force of the user's hand holding the active stylus 100, and transmitting the sensing result to the processing unit 220 so as to notify the active stylus 100 to enter the working mode. On the other hand, when the active stylus 100 is not held by the user, the pressure sensing unit 210 does not sense the force of the user's holding the active stylus 100, and thus notifying the processing unit 220 that the active stylus 100 needs to enter an idling mode so as to save power consumption. In this manner, the pressure sensing unit 210 is capable of detecting whether the active stylus 100 enters the working status.

The processing unit 220 is further coupled to the first optical distance measurement circuit 110 and the f 120 to receive the distance information about the first distance L1 and the second distance L2. By at least using the first distance L1 and the second distance L2, the processing unit 220 is capable of calculating the inclination angle θ1 of the active stylus 100 relative to the target surface 140. In addition, the wireless transmitting unit 230 is coupled to the processing unit 220 to receive the inclination angle θ1 calculated by the processing unit 220. The wireless communicating unit 230 may use the wireless communicating technology (e.g., Bluetooth transmitting method) to transmit the inclination angle θ1 to a host 240. Specifically, the host 240 is an electronic device such as a mobile phone, a tablet PC, a notebook computer and so on, which should not be construed as a limitation to the invention.

Figure 3A:
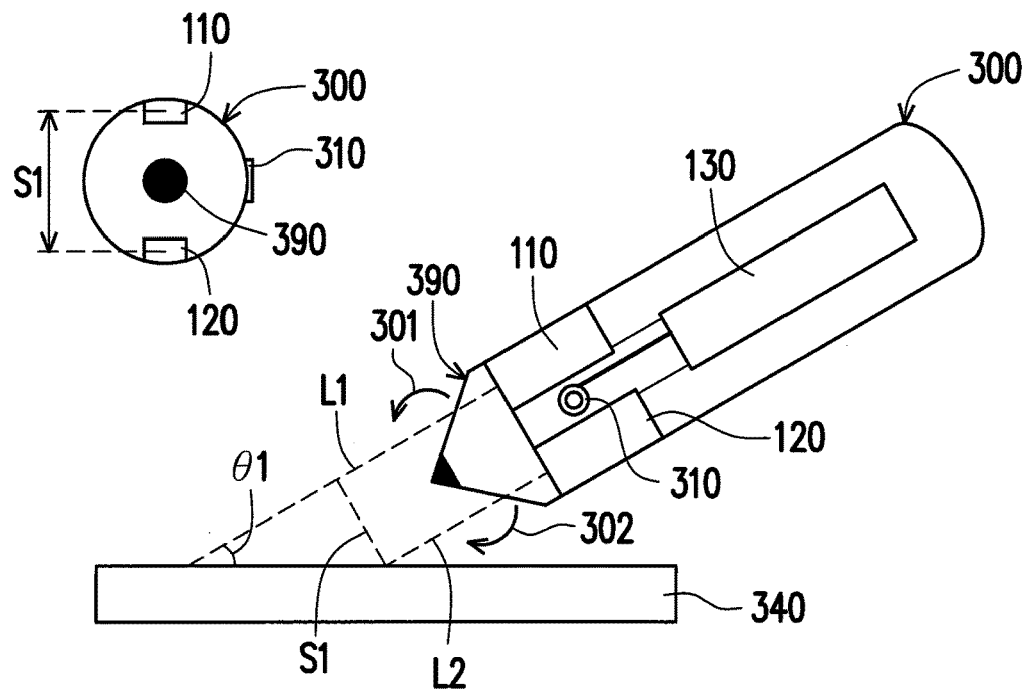
FIG. 3A and FIG. 3B are schematic circuit block diagrams and schematic views of implementation of an active stylus according to another embodiment of the invention.
Figure 3B:
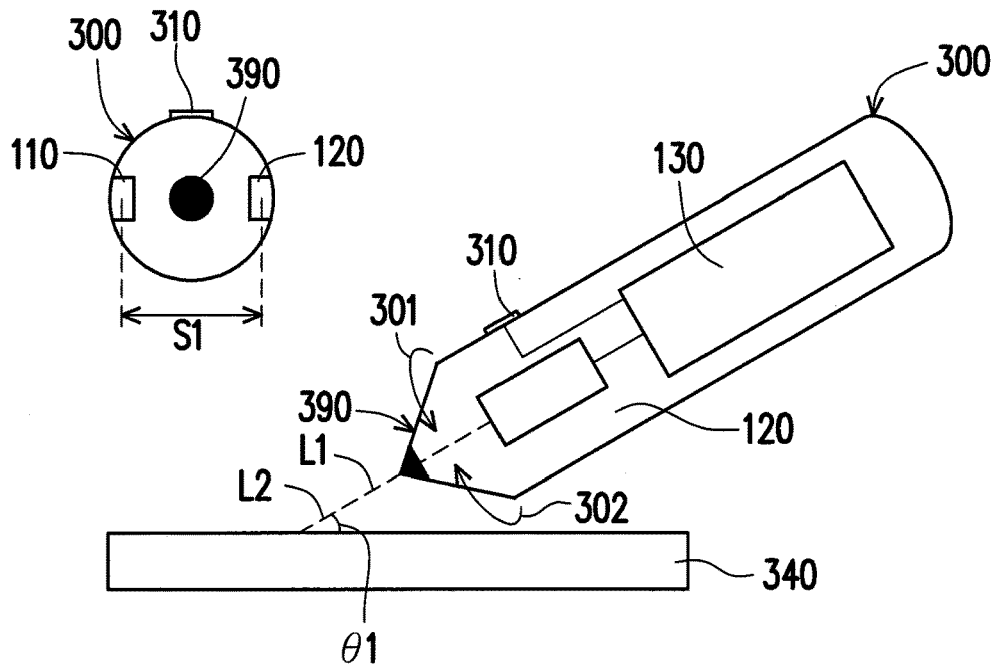

FIG. 3A and FIG. 3B are schematic circuit block diagrams and schematic views of implementation of an active stylus 300 according to another embodiment of the invention. The active stylus 300 includes a button 310, the first optical distance measurement circuit 110, the second optical distance measurement circuit 120 and the signal processing circuit 130. The first optical distance measurement circuit 110 may be disposed on a first side of a tip portion 390 of the active stylus 300, the second optical distance measurement circuit 120 may be disposed on a second side of the tip portion 390 of the active stylus 300, and the third distance S1 is located between an optical path of the first optical distance measurement circuit 110 and an optical path of the second optical distance measurement circuit 120 as shown in FIG. 3A and FIG. 3B. In FIG. 3A and FIG. 3B, a target surface 340, the first optical distance measurement circuit 110, the second optical distance measurement circuit 120 and the signal processing circuit 130 may be inferred with reference to the target surface 140, the first optical distance measurement circuit 110, the second optical distance measurement circuit 120 and the signal processing circuit 130 shown in FIG. 1, and thus no further descriptions are incorporated herein.

The difference between the embodiments shown in FIG. 3A and FIG. 3B and the embodiment shown in FIG. 1 is that the active stylus 300 in FIG. 3A and FIG. 3B further includes the button 310 disposed on the surface of the active stylus 300. The button 310 is coupled to the signal processing circuit 130. Depending on the requirement of design, the function of the button 310 may be the function of the button disposed on conventional stylus or other function. In some embodiments, the function of the button 310 may be the function of a left button of the mouse. Generally speaking, when the user holds the active stylus 300, even if the button 310 is disposed on a lateral side of the active stylus 300 (see FIG. 3A) or other position, the user rotates the active stylus 300 to make the button 310 face upward (shown in FIG. 3B). Accordingly, the user may rotate the active stylus 300 to rotate the optical distance measurement circuits 110 and 120 to the initial position. In other words, the button 310 may be used to define a basis surface (initial position) of the first optical distance measurement circuit 110 and the second optical distance measurement circuit 120.

Referring to FIG. 3B, when the first distance L1 measured by the first optical distance measurement circuit 110 and the second distance L2 measured by the second optical distance measurement circuit 120 are about the same, the signal processing circuit 130 is capable of determining that the active stylus 300 is in a "non-rotating status"; that is, the optical distance measurement circuits 110 and 120 are at the initial position (basis position). When the user rotates the active stylus 300 along a first direction 301 (counter-clockwise direction), the active stylus 300 may change from the status shown in FIG. 3B to the status shown in FIG. 3A such that the first distance L1 is increased and the second distance L2 is decreased. When the signal processing circuit 130 detects that the first distance L1 is increased and the second distance L2 is decreased, the signal processing circuit 130 determines that the active stylus 300 is rotated along the first direction 301 with the longitudinal direction as the rotating axis. It may be inferred similarly that when the signal processing circuit 130 detects that the first distance L1 is decreased and the second distance L2 is increased, the signal processing circuit 130 determines that the active stylus 300 is rotated along a second direction 302 (clockwise direction) with the longitudinal direction as the rotating axis.

Therefore, the active stylus 300 in FIG. 3A and FIG. 3B is capable of detecting the rotating direction of the active stylus 300 with the longitudinal direction as the rotating axis and reporting the rotating direction to the host (e.g., touch display panel). For example, the target surface 340 may be a touch display panel of the host. The active stylus 300 may report the rotating direction of itself to the host; thereafter, the host is capable of triggering a corresponding controlling function according to the rotating direction of the active stylus 300. For example, when the user would like to roll a web page or switch page of an electronic book, the user may rotate the active stylus 300 with the longitudinal direction as the rotating axis. The host may roll the web page or switch page of the electronic book correspondingly according to the rotating direction of the active stylus 300.

Figure 4:
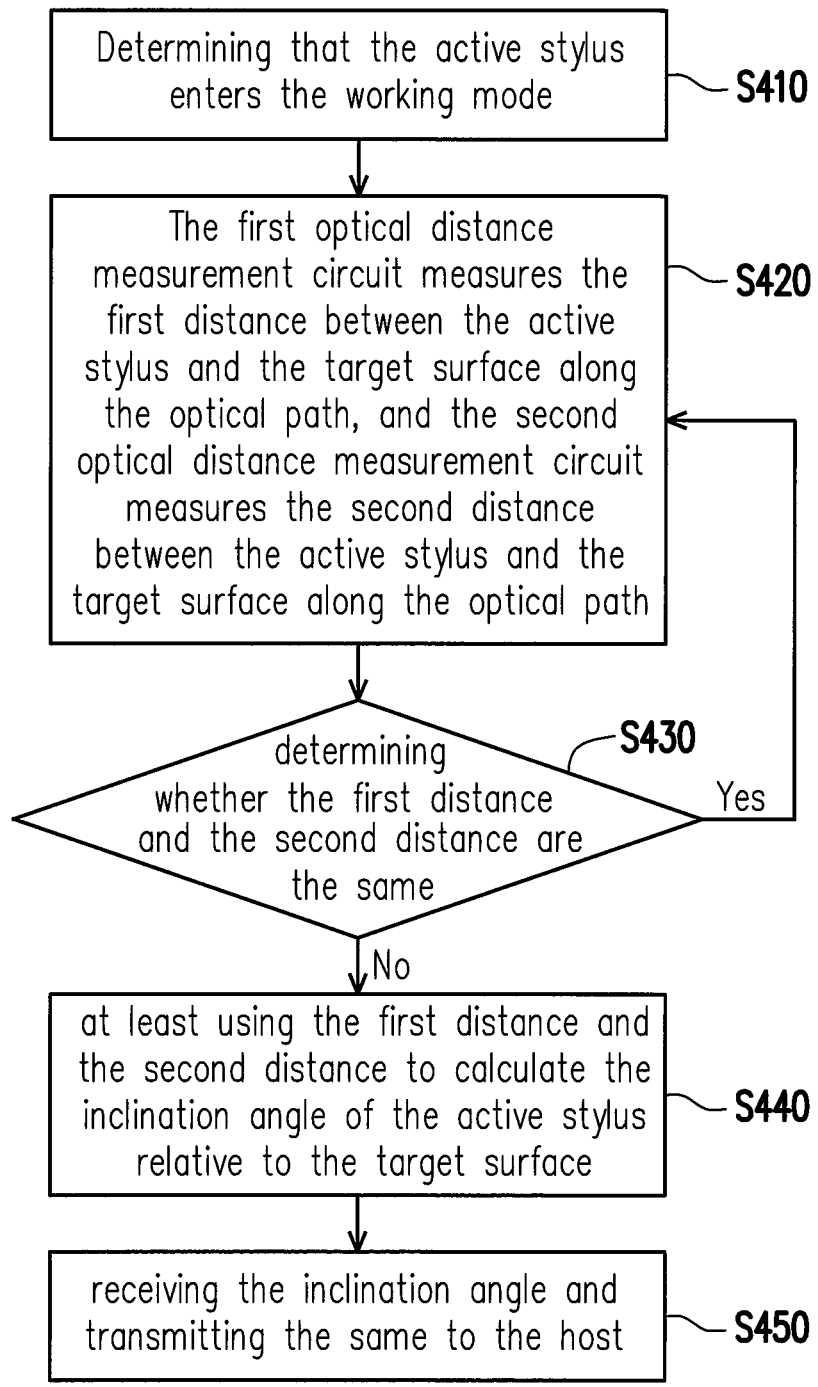
FIG. 4 is a schematic flowchart of a detection method of an active stylus according to an embodiment of the invention.

FIG. 4 is a schematic flowchart of a detection method of an active stylus according to an embodiment of the invention. Referring to FIG. 1, FIG. 2 and FIG. 4, in step S410, the pressure sensing unit 210 determines that the active stylus 100 enters the working mode. In step S420, the first optical distance measurement circuit 110 measures the first distance L1 between the active stylus 100 and the target surface 140 along the optical path, and the second optical distance measurement circuit 120 measures the second distance L2 between the active stylus 100 and the target surface 140 along the optical path. In step S430, the processing unit 220 determines whether the first distance L1 and the second distance L2 are the same. Specifically, if the first distance L1 is the same as the second distance L2, then the active stylus 100 performs step S420 again, otherwise the active stylus 100 carries out step S440. In step S440, the processing unit 220 at least uses the first distance L1 and the second distance L2 to calculate the inclination angle θ1 of the active stylus 100 relative to the target surface 140. In step S450, the wireless transmitting unit 230 receives the inclination angle θ1 and transmit the same to the host 240.

Figure 5:
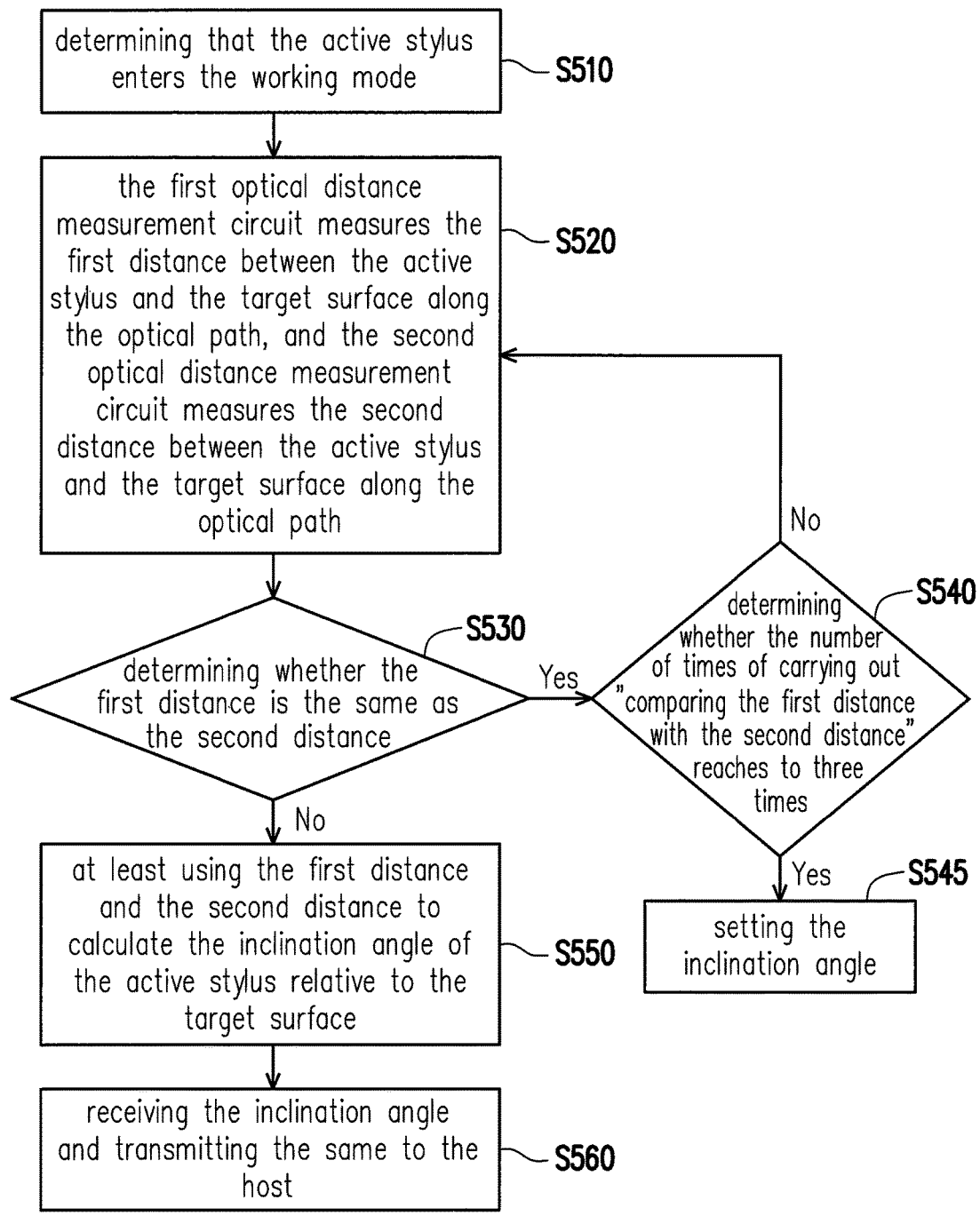
FIG. 5 is a schematic flowchart of a detection method of an active stylus according to another embodiment of the invention.

FIG. 5 is a schematic flowchart of a detection method of an active stylus according to another embodiment of the invention. Referring to FIG. 1, FIG. 2 and FIG. 5, in step S510, the pressure sensing unit 210 determines that the active stylus 100 enters the working mode. In step S520, the first optical distance measurement circuit 100 measures the first distance L1 between the active stylus 100 and the target surface 140 along the optical path, and the second optical distance measurement circuit 120 measures the second distance L2 between the active stylus 100 and the target surface 140 along the optical path. In step S530, the processing unit 220 determines whether the first distance L1 is the same as the second distance L2. Specifically, if the first distance L1 is the same as the second distance L2, then the active stylus 100 carries out step S540, otherwise the active stylus 100 carries out step S550. In step S540, the processing unit 220 determines whether the number of times of carrying out "comparing the first distance L1 with the second distance L2" (i.e., step S530) reaches to three times. When the number of times of carrying out step S530 does not reach three times, the active stylus 100 carries out step S520 and step S530 again.

When the determining result of step S540 shows that "the results of comparing the first distance L1 with the second distance L2 are all the same", the processing unit 220 carries out step S545. In step S545, depending on the requirement of design, the processing unit 220 may set the inclination angle θ1 as 45 degrees, or uses the inclination angle θ1 successfully acquired from the previous step as the inclination angle θ1 for this time. After step S545 is completed, the processing unit 220 may carry out step S560. In step S560, the processing unit 220 may transmit the inclination angle θ1 set in step S545 to the host 240 via the wireless transmitting unit 230.

When the processing unit 220 in step S530 determines that the first distance L1 and the second distance L2 are different, the active stylus 100 carries out step S550. In step S550, the processing unit 220 at least uses the first distance L1 and the second distance L2 to calculate the inclination angle θ1 of the active stylus 100 relative to the target surface 140. In step S560, the processing unit 220 may transmit the inclination angle θ1 calculated in step S550 to the host 240 via the wireless transmitting unit 230.

Figure 6:
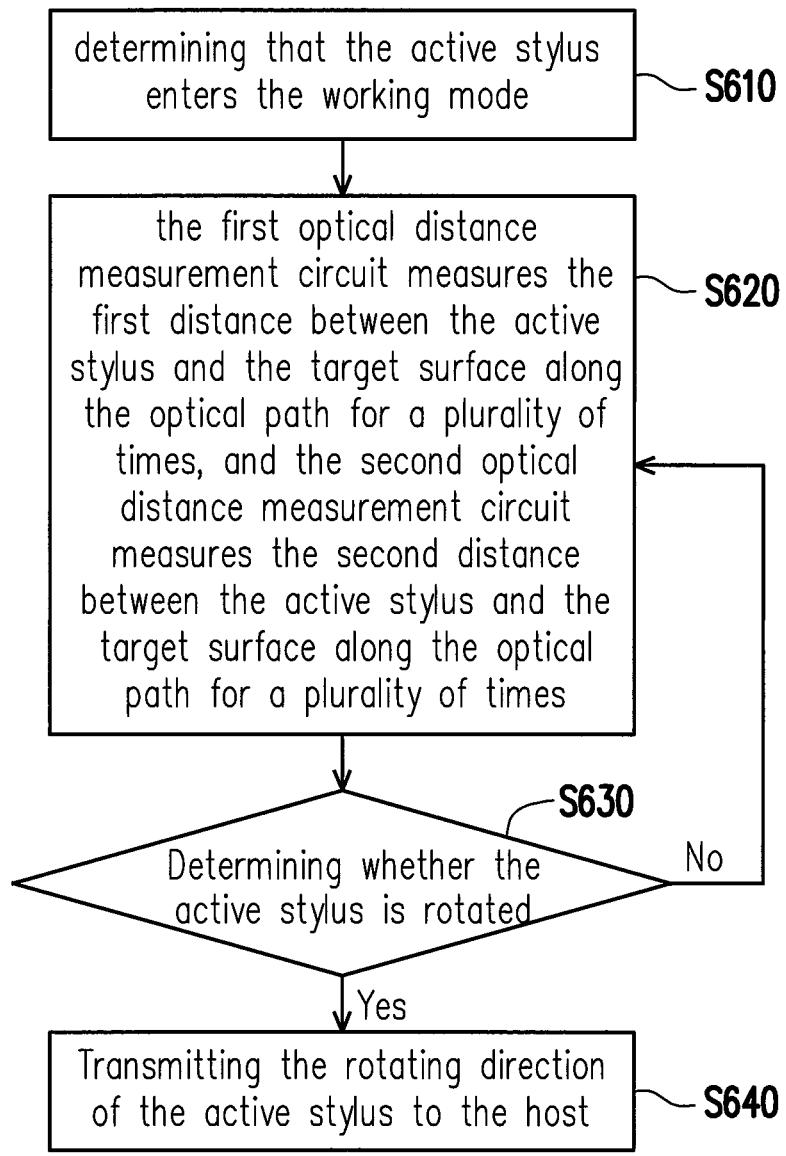
FIG. 6 is a schematic flowchart of a detection method of an active stylus according to still another embodiment of the invention.

FIG. 6 is a schematic flowchart of a detection method of an active stylus according to still another embodiment of the invention. Referring to FIG. 2, FIG. 3A, FIG. 3B and FIG. 6, in step S610, the processing unit 220 determines that the active stylus 300 enters the working mode according to the sensing result of the pressure sensing unit 210. In step S620, the first optical distance measurement circuit 110 measures the first distance L1 between the active stylus 300 and the target surface 340 along the optical path for a plurality of times, and the second optical distance measurement circuit 120 measures the second distance L2 between the active stylus 300 and the target surface 340 along the optical path for a plurality of times. In step S630, the processing unit 220 determines whether the active stylus 300 is rotated according to the first distance L1 and the second distance L2. For example, when the change of the first distance L1 is consistent with the change of the second distance L2, it is determined that the active stylus 300 is not rotated. The description "the change of the first distance L1 is consistent with the change of the second distance L2" means that the amount of increase of the first distance L1 is the same as the amount of increase of the second distance L2, and/or the amount of decrease of the first distance L1 is the same as the amount of decrease of the second distance L2, and/or neither of the first distance L1 and the second distance 2 is changed. When the determining result of step S630 shows that the active stylus 300 is not rotated, the active stylus 300 carries out step S620 and step S630 again.

When the first distance L1 becomes larger and the second distance L2 becomes smaller, or the first distance L1 becomes smaller and the second distance becomes larger, it can be determined in step S630 that the active stylus 300 is rotated. When the determining result of step S630 shows that the active stylus 300 is rotated, that is, the active stylus 300 is rotated along the first direction 301 or the second direction 302 with the longitudinal direction as the rotating axis, then the active stylus 300 carries out step S640. In step S640, the processing unit 220 transmits the rotating direction of the active stylus 300 to the host 240 via the wireless transmitting unit 230.

In summary, the active stylus provided by the embodiments of the invention is capable of configuring a plurality of sets of optical distance measurement circuits at different positions of the tip portion. The optical distance measurement circuit is capable of projecting light to the target surface, sensing the reflective light reflected from the target surface, and acquiring distance information according to the reflective light. The optical distance measurement circuits at different positions are capable of sensing different distances. Based on the distances between the active stylus and the target surface, the active stylus is capable of calculating the inclination angle of the active stylus relative to the target surface, and/or detecting the rotating direction of the active stylus with the longitudinal direction as the rotating axis. According to the different inclination angles of the active stylus, the host is capable of exhibiting the effect of different handwritings. According to the different rotating directions of the active stylus, the host is capable of triggering the corresponding controlling function such as carrying out page selection.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. An active stylus, comprising:
a first optical distance measurement circuit, disposed on a first side of a tip portion of the active stylus, for measuring a first distance between the active stylus and a target surface along a longitudinal direction of the active stylus;
a second optical distance measurement circuit, disposed on a second side of the tip portion of the active stylus opposite to the first side, for measuring a second distance between the active stylus and the target surface along the longitudinal direction of the active stylus; and
a signal processing circuit, coupled to the first optical distance measurement circuit to receive the first distance and to the second optical distance measurement circuit to receive the second distance, for at least using the first distance and the second distance to calculate an inclination angle of the active stylus relative to the target surface and for detecting a rotating direction of the active stylus with the longitudinal direction of the active stylus as a rotating axis according to a difference between amount of change of the first distance and amount of change of the second distance.

2. The active stylus according to claim 1, wherein a light projecting direction of the first optical distance measurement circuit and a light projecting direction of the second optical distance measurement circuit are parallel with the longitudinal direction of the active stylus.

3. The active stylus according to claim 1, wherein a third distance is located between the first optical distance measurement circuit and the second optical distance measurement circuit.

4. The active stylus according to claim 1, wherein the signal processing circuit comprises:
a pressure sensing unit, detecting whether the active stylus enters a working status;
a processing unit, coupled to the first optical distance measurement circuit and the second optical distance measurement circuit for receiving the first distance and the second distance, for at least using the first distance and the second distance to calculate the inclination angle; and
a wireless transmitting unit, coupled to the processing unit to receive the inclination angle, for transmitting the inclination angle to a host.

5. The active stylus according to claim 1, further comprising:
a button, disposed on a surface of the active stylus and coupled to the signal processing circuit.

6. The active stylus according to claim 1, wherein the signal processing circuit determines that the active stylus is in a non-rotating status when the first distance and the second distance are the same, the signal processing circuit determines that the active stylus is rotated along a first direction with the longitudinal direction as the rotating axis when the first distance is increased and the second distance is decreased, and the signal processing circuit determines that the active stylus is rotated along a second direction with the longitudinal direction as the rotating axis when the first distance is decreased and the second distance is increased.

7. A detection method of an active stylus, comprising:
disposing a first optical distance measurement circuit on a first side of a tip portion of the active stylus;
disposing a second optical distance measurement circuit on a second side of the tip portion of the active stylus opposite to the first side;

measuring a first distance between the active stylus and a target surface along a longitudinal direction of the active stylus by the first optical distance measurement circuit;

measuring a second distance between the active stylus and the target surface along the longitudinal direction of the active stylus by the second optical distance measurement circuit;

calculating, by using at least the first distance and the second distance via a signal processing circuit, an inclination angle of the active stylus relative to the target surface; and detecting, by using a difference between the amount of change of the first distance and the amount of change of the second distance via the signal processing circuit, a rotating direction of the active stylus with the longitudinal direction of the active stylus as a rotating axis.

8. The detection method of the active stylus according to claim 7, wherein a light projecting direction of the first optical distance measurement circuit and a light projecting direction of the second optical distance measurement circuit are parallel with the longitudinal direction of the active stylus.

9. The detection method of the active stylus according to claim 7, wherein a third distance is located between the first optical distance measurement circuit and the second optical distance measurement circuit.

10. The detection method of the active stylus according to claim 7, further comprising:

disposing a button on a surface of the active stylus.

11. The detection method of the active stylus according to claim 7, wherein the step of detecting the rotating direction of the active stylus with the longitudinal direction as the rotating axis comprises:

determining that the active stylus is in a non-rotating status by the signal processing circuit when the first distance and the second distance are the same;

determining that the active stylus is rotated along a first direction with the longitudinal direction as the rotating axis by the signal processing circuit when the first distance is increased and the second distance is decreased; and determining that the active stylus is rotated along a second direction with the longitudinal direction as the rotating axis by the signal processing circuit when the first distance is decreased and the second distance is increased.

* * * * *